COMBINED MAGNETIC TRANSDUCING AND ERASE HEAD

Filed Nov. 5, 1963 2 Sheets-Sheet 1

Inventor
Susumu Makimura
By Stevens, Davis, Miller & Mosher
ATTORNEYS

Inventor
Susumu Makimura
By Stevens, Davis, Miller & Mosher
ATTORNEYS

United States Patent Office 3,371,164
Patented Feb. 27, 1968

3,371,164
COMBINED MAGNETIC TRANSDUCING AND ERASE HEAD

Susumu Makimura, Yokohama, Japan, assignor to Matsushita Electric Industrial Co., Ltd., Osaka, Japan, a corporation of Japan
Filed Nov. 5, 1963, Ser. No. 321,522
Claims priority, application Japan, Nov. 10, 1962, 37/50,595
6 Claims. (Cl. 179—100.2)

ABSTRACT OF THE DISCLOSURE

A magnetic head assembly capable of performing the functions of sound recording, reproducing and erasing, which comprises a central yoke member constituted of a plate of nonmagnetic material interposed between plates of magnetic material and U-shaped cores arranged in abutment against both sides of said central yoke member and having a sound recording and reproducing coil and an erasing coil wound thereon respectively, whereby a sound recording and reproducing magnetic circuit and an erasing magnetic circuit are formed independently of each other.

The present invention relates to a magnetic head assembly having both functions of a magnetic erasing head and a sound recording and reproducing head combined in a unitary structure.

The primary object of the invention is to provide a magnetic head assembly of the above feature which can be manufactured at low cost due to a reduced amount of material required, and which can be used at a high efficiency in spite of its extremely small size.

According to the invention, there is provided a magnetic head assembly comprising two magnetic circuits which are magnetically independent of each other, said magnetic circuits being composed of a central yoke member common to both of said circuits, said central yoke member being constituted of a plate of nonmagnetic material interposed between plates of magnetic material, cores of substantially U-shaped section disposed opposite to each other and having their rear end faces brought into close abutment with either side of said central yoke member, and spacers of nonmagnetic material disposed in opposed relation in gaps between the front ends of said cores and said central yoke member, an erasing coil wound about one of said cores, and a sound recording and reproducing coil wound about the other core.

There are other objects and particularities of the invention which will become obvious from the following description with reference to the accompanying drawings in which.

Figure 1A:
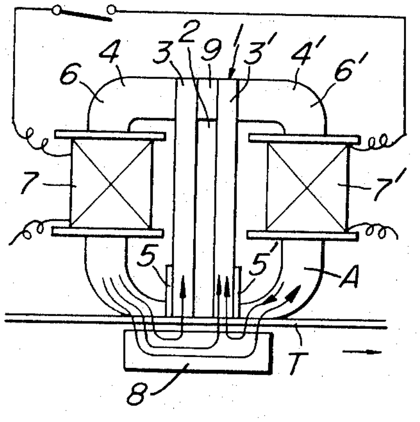
FIG. 1A is a plan view of an embodiment of a magnetic head assembly of the invention.
Figure 1B:
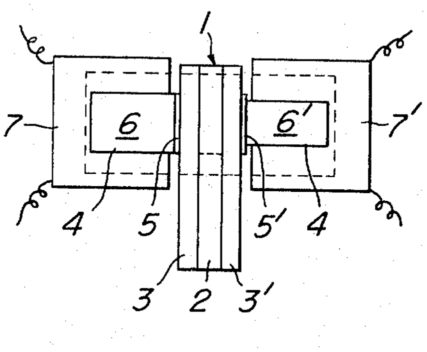
FIG. 1B is a front elevational view of the magnetic head assembly of FIG. 1A.

In FIGS. 1A and 1B, there is shown a magnetic head assembly of the invention, centrally of which a central yoke member 1 is disposed. The central yoke member 1 includes a plate 2 of nonmagnetic material, to the respective sides of which plates 3 and 3' of magnetic material are bonded by means such as an adhesive, caulking, or rolling. Cores 4 and 4' of substantially U-shaped section are made to closely abut the respective sides of the central yoke member 1 with their rear end faces. While, between respective front faces of the cores 4 and 4' and the central yoke member 1, there are disposed spacers 5 and 5' of non-magnetic material. It will be known that, by the above arrangement, two D-shaped magnetic circuits 6 and 6' are formed which are magnetically independent of each other. An erasing coil 7 is wound about the core 4 in the magnetic circuit 6. While, a sound recording and reproducing coil 7' is wound about the core 4' in the magnetic circuit 6'.

Therefore, it will be understood that a magnetic erasing head section is formed by said magnetic circuit 6 and said erasing coil 7, while a magnetic sound recording and reproducing head section is formed by said magnetic circuit 6' and said coil 7'. A member 8 of magnetic material is disposed adjacent a face of the magnetic head assembly on which a magnetic tape T is made to travel in abutting relation therewith. Further, a member 9 of magnetic material is disposed at the rear end portion of the plate 2 of nonmagnetic material as shown in the drawings. The provision of these magnetic bodies is effective to constitute a magnetic path between the spacers 5 and 5', and will improve frequency characteristic of the magnetic head assembly.

When it is intended to make sound recording by the use of the magnetic head assembly having the arrangement as described above, the magnetic head assembly is made to abut a magnetic material deposition face of the magnetic tape T, and the tape T is made to travel in the direction of the arrow as shown in FIG. 1A. In this manner, erasing is first made by the magnetic erasing head section and subsequently sound recording is made by the magnetic recording and reproducing head section. During the sound recording, leakage magnetic flux by an erasing current in the coil 7 wound about the core 4 of the magnetic circuit 6 exerts its effect on a portion adjacent the spacer 5' of the magnetic circuit 6'. When, on the other hand, a sound recording signal is impressed on the coil 7' of the magnetic circuit 6' as soon as the current is allowed to flow through said coil 7, leakage magnetic flux approximately proportional to the signal will generate from portions of the plate 3' of magnetic material and the core 4' adjacent the spacer 5'. The leakage flux from the portions of the plate 3' interferes with the leakage flux from the portions of the plate 3 of magnetic material and the core 4 adjacent the spacer 5, and lines of magnetic force are subject to variation at the travelling face for the magnetic tape T in the direction perpendicular to said tape T. Therefore, the leakage flux makes a sharp rise and frequency characteristic especially for short wavelengths can be improved.

Figure 3:
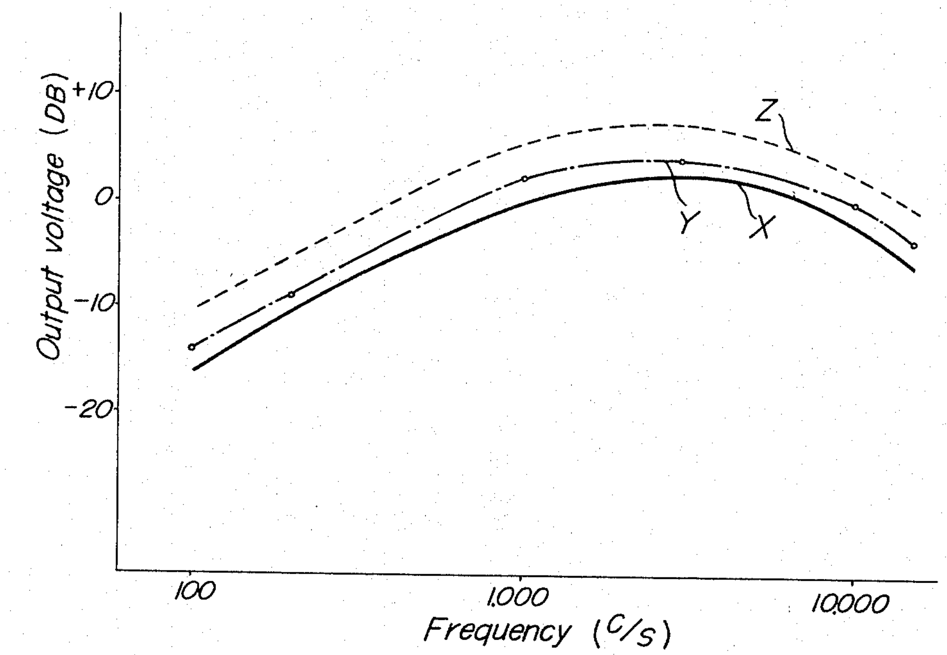
FIG. 3 is a graphical illustration showing frequency characteristics of the magnetic head assembly shown in FIGS. 1A, 1B, 2A and 2B.

Frequency characteristics in said embodiment, when the sound recording signal is supplied to the coil 7' in superimposed relation with a bias signal, will be as shown by a curve Y of FIG. 3. It will be apparent that this is better than a characteristic curve X representing the case wherein no bias signal is superimposed on the sound recording signal.

Figure 2A:
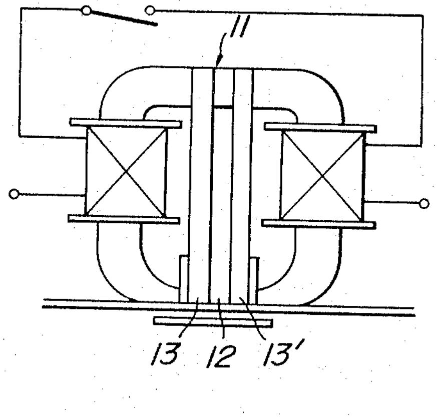
FIG. 2A is a plan view of another embodiment of the invention.

In case of sound reproducing, sound reproduction may be made only with the magnetic sound recording and reproducing head section. Alternatively, sound reproduction may be made with the coils of the magnetic erasing head section and the magnetic sound recording and reproducing head section wound in a manner that induced voltages with respect to the noise magnetic field are cancelled with each other and, at the same time, output sound voltages are superimposed on each other. This may be accomplished by means of the switching arrangement generally as shown in FIGURES 1A and 2A.

Figure 2B:
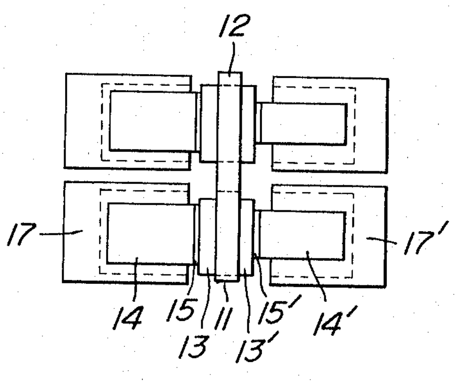
FIG. 2B is a front elevational view of FIG. 2A.

FIG. 2 shows another embodiment of the invention. In FIG. 2, it will be seen that two magnetic head assemblies each of which is as shown in FIG. 1 are coupled together to form a multielement magnetic head assembly adapted for multichannel recording such as one for stereo recording. In this embodiment, a plate 12 of non-magnetic material forming a part of a central yoke member 11 is similar to but has a greater vertical length than the plate 2 of the single element magnetic head assembly of the previous embodiment to receive thereon an additional magnetic head assembly comprising plates 13 and 13' of magnetic material, cores 14 and 14', spacers 15 and 15', and coils 17 and 17', in vertically spaced parallel relation to each other. This constitution will permit the interchangeability of parts with the single element magnetic head assembly and will be especially useful for the purpose of stereo recording.

In the embodiments of FIGS. 1 and 2, the plate of non-magnetic material may preferably be an electrically non-conductive material such as Bakelite rather than a conductive material such as metal, the nonconductive material used as the nonmagnetic member will assist more formation of the leakage flux on the sound recording side and will contribute to the improvement in the frequency characteristics.

By the provision of the member 8 of magnetic material in opposed relation to the travelling face for the magnetic tape, a magnetic path is formed at the tape travelling face portions of the two magnetic circuits 6 and 6'. This magnetic path will be effective to provide a more sharp rise of lines of magnetic force directed towards the tape T and the frequency characteristics can be improved in recording as shown by a curve Z of FIG. 3.

Referring to FIG. 1A, a sound current flows through the core 7' simultaneously with the high frequency current. Therefore, the magnetic flux superimposed by bias magnetic flux and sound signal magnetic flux appears at the portion of the gap that is the portion where the spacer 5' is inserted.

On the other hand, the coil 7 carries a high frequency current (current of the same frequency as the current for bias) for erasing. In this case, a part of the current is positively leaked out to the portion of the gap where the spacer 5' is inserted. In further detail, the erasing magnetic field and the bias magnetic field become opposite in phase at a portion indicated by A in FIG. 1A. Thus, it is possible to prevent the bias magnetic field from becoming excessively large at a portion where the tape moves away from the head and accordingly it is possible to obviate the drawback possessed by the AC biasing method that the high frequency portion of a sound recording signal is cancelled by the excessive bias magnetic flux, deteriorating the frequency characteristics.

In this case, arrangement is made such that the phase of the high frequency magnetic flux leading out as shown becomes just opposite to that of the bias magnetic flux, whereby the rise of the bias magnetic field at the portion of the gap becomes sharp and the frequency characteristics can be improved as shown by a curve Z of FIG. 3.

The provision of the member 9 of magnetic material at a portion of the rear end of the plate 2 of nonmagnetic material is effective for improvement of the characteristics, which is approximately similar to the improvement that is attained by the provision of the magnetic member 8 in opposition to said travelling face for the tape. The only difference between said members 8 and 9 is that the former is provided at a different position from the latter in order to obtain a suitable amount of magnetic flux leaking from the erasing side to the sound recording side. Member 9 according to the present application makes the degree of coupling between the erasing side and the sound recording and reproducing side small and accordingly provides suitable leakage of magnetic flux from the erasing side to the sound recording side. Further, the plate of nonmagnetic material may not necessarily take the form of a plate depending upon a manner of manufacturing the same, but may be of any shape as long as it can sufficiently prevent magnetic coupling between the plates of magnetic material. Ordinarily, permalloy is preferred as the material for the magnetic plates and cores, but such material as ferrite or aluperm may equally effectively be used. The magnetic bodies may be formed of a single plate, but laminated structure is preferred in view of less eddy current generated and resultant improvement in the characteristics.

The embodiments of the invention described above may be modified in the following manner. Or more precisely, the magnetic erasing circuit and the magnetic sound recording and reproducing circuit may be bonded to the respective sides of the nonmagnetic plate by means of an adhesive, or the nonmagnetic plate and the magnetic plates may be rolled into a unitary structure with the nonmagnetic plate sandwiched between the two magnetic plates.

The magnetic head assembly with the above features of the invention has the following advantages over magnetic heads of conventional constitution:

(1) Improvement in the performance can be attained since sound recording, reproducing and erasing can be effected by the substantially single magnetic head assembly of unitary structure and of small size. The magnetic head assembly, when incorporated in a tape recorder, occupies an extremely smaller area than that occupied by conventional combination comprising one sound recording and reproducing head and one erasing head.

(2) Since, in the magnetic head assembly of the invention, the sound recording and reproducing head and the erasing head can be aligned in a same height level as a unitary structure during manufacturing, any adjustment of relative height is utterly unnecessary. Or more precisely, in a conventional system having a sound recording and reproducing head provided separately from a conventional erasing head, height adjustment of the heads is generally necessary. Because misalignment between a portion of the tape being recorded with sound and a portion being erased, when subsequent sound recording is made simultaneously with the erasing of sound records on the tape, will result in a portion of previous sound records left unerased. In the magnetic head assembly of the invention, on the contrary, accurate positioning can easily be attained during the manufacturing thereof by the use of a suitable jig or the like, and this will eliminate any necessity of height adjustment during the assembling of a tape recorder, thus simplifying the manufacturing process of the same.

(3) In the magnetic head assembly of the invention, an extremely small gap of the order of 1 mm. can be provided between the erasing head and the sound recording and reproducing head. This will facilitate the elimination of unerased portions, for example, during the compilation of magnetic tapes. The magnetic head assembly will require only a single pad for supporting the tape but a stable operation thereof can be accomplished. The head assembly consumes little power and its life can be extended by virtue of the small area with which it contacts the tape.

Thus, it will be understood that sound recording and reproducing up to an extremely high frequency can be affected by the magnetic head assembly according to the invention.

What is claimed is:

1. A magnetic head assembly comprising two magnetic circuits which are magnetically independent of each other, said magnetic circuits being composed of a central yoke member common to both of said circuits, said central yoke member being constituted of a plate of non-magnetic material interposed between plates of magnetic material, cores of substantially U-shaped section disposed opposite to each other and having their rear end faces brought into close abutment with either side of said central yoke member, and spacers of nonmagnetic material disposed in opposed relation in gaps between the front ends of said cores and said central yoke member, a member of magnetic material being disposed between the rear ends of said cores and between the plates of magnetic material and in general alignment with the plate of nonmagnetic material, an erasing coil wound about one of said cores, and a sound recording and reproducing coil wound about the other core.

2. A magnetic head assembly according to claim 1, wherein said plate of nonmagnetic material forming part of said central yoke member is a nonconductor.

3. A magnetic head assembly according to claim 1, wherein a member of magnetic material is disposed adjacent said spacers at a position opposite a face on which a magnetic tape travels.

4. A magnetic head assembly comprising two magnetic circuits which are magnetically independent of each other, said magnetic circuits being composed of a central yoke member common to both of said circuits, said central yoke member being constituted of a plate of nonmagnetic material interposed between plates of magnetic material, cores of substantially U-shaped section disposed opposite to each other and having their rear end faces brought into close abutment with either side of said central yoke member, a member of magnetic material being disposed between the rear ends of said cores and between the plates of magnetic material and in general alignment with the plate of nonmagnetic material, and spacers of nonmagnetic material disposed in opposed relation in gaps between the front ends of said cores and said central yoke member, an erasing coil wound about one of said cores, and a sound recording and reproducing coil wound about the other core, wherein a bias current and sound current are superimposed upon each other in said sound recording and reproducing coil only during recording.

5. A magnetic head assembly according to claim 4, wherein a member of magnetic material is disposed adjacent said spacers at a position opposite a face on which a magnetic tape travels.

6. A magnetic head assembly comprsing two magnetic circuits which are magnetically independent of each other, said magnetic circuits being composed of a central yoke member common to both of said circuits, said central yoke member being constituted of a plate of nonmagnetic material interposed between plates of magnetic material, cores of substantially U-shaped section disposed opposite to each other and having their rear end faces brought into close abutment with either side of said central yoke member, a member of magnetic material being disposed between the rear ends of said cores and between the plates of magnetic material and in general alignment with the plate of nonmagnetic material, and spacers of nonmagnetic material disposed in opposed relation in gaps between the front ends of said cores and said central yoke member, an erasing coil wound about one of said cores, and a sound recording and reproducing coil wound about the other core, wherein windings of said magnetic circuits independent of each other are so arranged that, during the reproducing only, induced voltages with respect to the noise magnetic field are cancelled with each other, while output sound voltages thereof are superimposed on each other, and wherein a member of magnetic material is disposed adjacent said spacers at a position opposite a face on which a magnetic tape travels.

References Cited

UNITED STATES PATENTS

| | | | |
|---|---|---|---|
| 2,456,767 | 12/1948 | Camras | 179—100.2 |
| 2,784,259 | 3/1957 | Camras | 179—100.2 |
| 2,785,232 | 3/1957 | Camras | 179—100.2 |
| 2,803,708 | 8/1957 | Camras | 179—100.2 |
| 2,804,506 | 8/1957 | Schurch et al. | 340—174.1 |
| 2,885,488 | 5/1959 | Andrews | 179—100.2 |

OTHER REFERENCES

Burstein & Pollak: Elements of Tape Recorder Circuits; Gernsback Library, Inc., New York, 1957; pages 207–209.

TERRELL W. FEARS, *Primary Examiner.*

BERNARD KONICK, *Examiner.*

L. KURLAND, *Assistant Examiner.*